June 10, 1952 R. B. WOODBURY 2,599,964
STABILIZED FREQUENCY DIVIDER CIRCUIT
Filed Sept. 14, 1945

INVENTOR
ROGER B. WOODBURY

BY Ralph L Chappell
ATTORNEY

Patented June 10, 1952

2,599,964

UNITED STATES PATENT OFFICE 2,599,964

STABILIZED FREQUENCY DIVIDER CIRCUIT

Roger B. Woodbury, Boston, Mass., assignor, by mesne assignments, to the United States of America as represented by the Secretary of the Navy Application September 14, 1945, Serial No. 616,413

7 Claims. (Cl. 250—27)

This invention relates to frequency divider circuits and in particular to a stabilized blocking oscillator circuit for use as a frequency divider for dividing intermittent series of periodic pulses.

In many applications of electronic circuits it is desired to obtain a pulse of output energy corresponding to every $n$th pulse only of intermittent series of periodic pulses fed into the circuit, where $n$ is counted from the first pulse of each series and with no response or output corresponding to the remainder of the input pulses. For example, if from such a circuit only every tenth input pulse produces an output pulse corresponding to it while the intermediate nine pulses do not cause any output, there is produced a periodic sub-multiple series of output pulses whose frequency is related to the series of input pulses by a definite ratio, in this case, one to ten. The principal difficulty to be overcome in circuits for this purpose is to assure that the output will be responsive to exactly the correct input pulses and will have no discontinuity in the division ratio at the beginning of a particular series.

It is therefore the object of this invention to provide a frequency dividing, blocking oscillator circuit which is largely insensitive to variation in supply voltages and tube characteristics, and hence stable and reliable in its operation.

It is another object to construct a blocking oscillator frequency divider which will be inoperative in the absence of input pulses, but which will begin operation immediately from the same initial condition when a series of pulses is fed in from an external triggering source.

Figure 1:
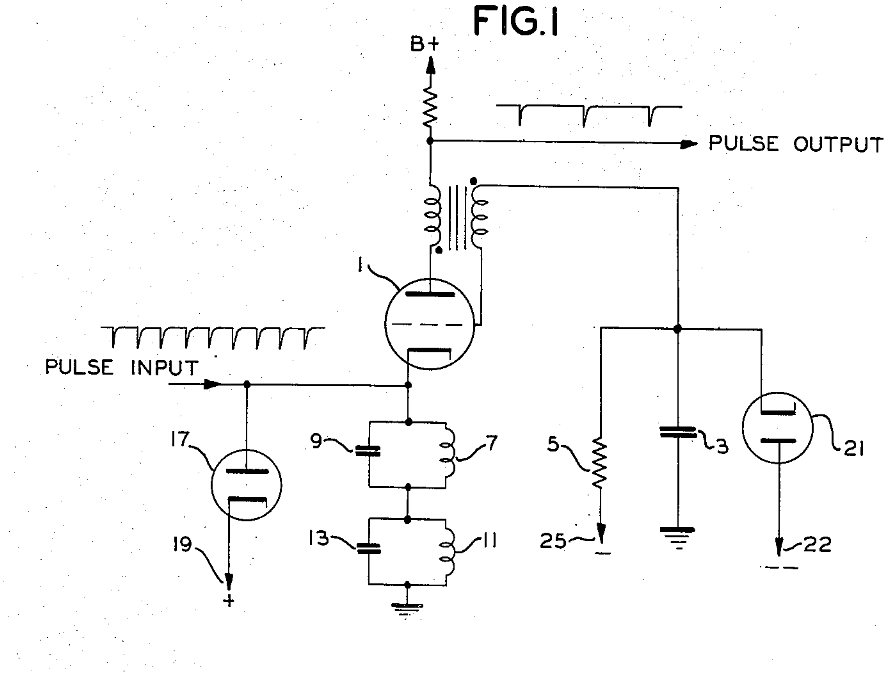
Figure 2:
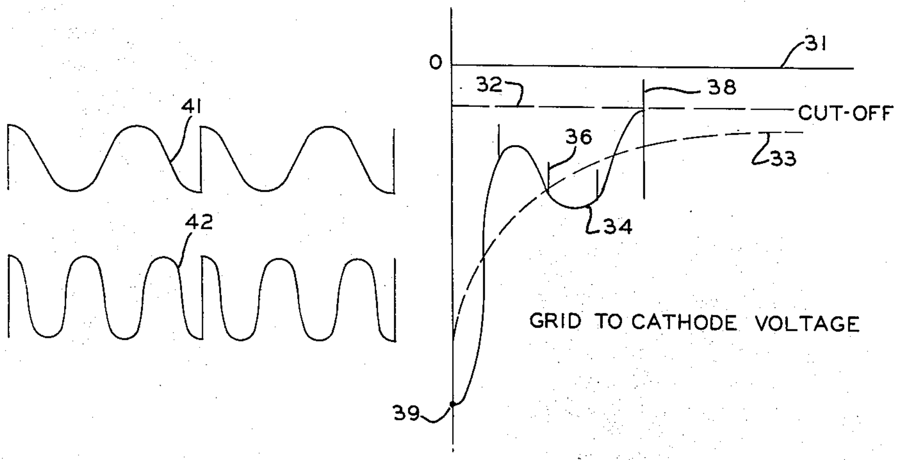

Fig. 1 is a circuit diagram of a blocking oscillator, conventional in all respects except for the addition in series in the cathode circuit of two parallel-resonant L–C ringing circuits and two diode limiting tubes one across the cathode circuit and one across the grid circuit; and Fig. 2 is a graph showing the form of the net grid-to-cathode voltage relation which is produced by the combination of voltages from input pulses, the ordinary blocking oscillator operation, and A. C. voltages deriving from the inserted L–C circuits.

Referring now to Fig. 1, there is shown a blocking oscillator triode tube 1 having conventional close transformer coupling. The grid of this circuit like that of the conventional blocking oscillator has a capacitor 3 and a resistor 5 in parallel. Here, however, there is also inserted in the cathode circuit, in series, two L–C parallel resonant ringer circuits one consisting of inductance 7 and capacitor 9 and the other of an inductance 11 and capacitor 13. As is well known, the grid-to-cathode voltage of the blocking oscillator is rapidly driven considerably negative when the tube conducts and normally rises back from below cut-off to conduction level again along an exponential curve determined by the time constant of the R–C circuit composed of resistor 5 and capacitor 3. (This is indicated by the dotted line of Fig. 2.)

In this circuit, however, when the tube 1 conducts the cathode current must also pass through the capacitors 9 and 13. When the oscillator blocks and the tube 1 ceases to conduct, oscillations are set up in the two L–C circuits inserted in the cathode circuit. The resonant frequencies of these two circuits are chosen in this instance so that two different alternating voltages are produced, and such that their algebraic addition produces an alternating voltage which drives the cathode far negative with respect to ground at the time of desired firing of the blocking oscillator.

The portion of the circuit which has been described represents the prior art. To this has been added a diode 17 having its plate connected to the cathode of the oscillator tube 1, and having its cathode connected to a suitable positive potential source indicated by the arrow 19. There has also been added a diode 21 having its cathode connected into the grid circuit of the oscillator tube 1, and having its plate connected to a suitable negative potential represented by the arrow marked 22. In addition, whereas the earlier blocking oscillator frequency dividers were designed to be free-running or continuous in operation the present circuit is intended to be inoperative in the absence of input pulses but immediately operative upon commencement of a series of pulses so that it will divide correctly as soon as it is started. The grid is biased sufficiently negative by connection through the grid resistor to a negative source 25 to prevent conduction until the occurrence of an input pulse. When the first pulse occurs, however, it is desirable that it start operation with the same set of initial conditions as exists in succeeding cycles. The diodes provide this control on initial conditions by respectively fixing the negative point to which the grid may drop and fixing the amplitude of the L–C oscillations produced by the ringing circuits.

Fig. 2 shows a graph of the grid-to-cathode voltage showing a zero reference line 31 and cut-off voltage difference line 32. Dotted line 33 represents the curve which the voltage difference would follow in returning from its initial cutoff value back toward conduction value. Superimposed on it are shown the resultant alternating voltages from the L–C ringers, represented by line 34. The incoming pulses being fed also into the cathode circuit are also shown as a series of pips riding on the A. C. wave form, one pip, for example, being the one numbered 36. When the net result of grid return potential 33, A. C. voltage 34 and a pulse, for example 38, combine to reach a grid-cathode voltage difference which is above the cutoff value 32 then conduction will occur and the cycle of events will repeat. Fig. 2 also includes two illustrative A. C. voltages 41 and 42 which might be produced by the respective L—C ringing circuits 7—9 and 11—13. Their resultant 34, which is a periodic irregular wave form, has been shown superimposed on the normal grid return line 33. When the oscillator blocks, the grid is driven rapidly negative but the action of diode 21 prevents it from dropping below a fixed negative value, for example point 39, depending on the voltage connected to point 22. Similarly, the greatest amplitude of the L—C oscillations is restricted by the positive voltage connected to point 19.

I claim:

1. A circuit for dividing the frequency of a repeated succession of negative input pulses comprising, a blocking oscillator circuit including an electron tube having at least a control grid and a cathode, a plurality of parallel combinations of inductance and capacitance serially connected between the cathode of said tube and ground, means for applying said negative pulses to the cathode of said tube, a first diode having an anode and a cathode, a source of positive voltage, said diode being connected with its anode and cathode respectively connected to the cathode of said tube and said source of positive voltage, and means for rendering said tube non-conductive during the absence of input pulses and also limiting the negative voltage to which the grid of said tube can drop when the oscillator blocks, said last-mentioned means comprising first and second sources of negative voltage, a resistor serially connected between the grid of said tube and said first source of negative voltage, a second diode having an anode and a cathode, said second diode being connected with its cathode connected to the grid side of said resistor and its anode connected to said second source of negative voltage.

2. A circuit for dividing the frequency of a repeated succession of input pulses comprising, a blocking oscillator circuit including an electron tube having at least a control grid and a cathode, a plurality of parallel combinations of inductance and capacitance serially connected between the cathode of said tube and ground, said combinations having inductance and capacitance values such that the resultant of the alternating voltages produced therein when said oscillator blocks is an unsymmetrical alternating voltage, means for applying said negative pulses to the cathode of said tube, means connected to the cathode of said tube for limiting the magnitude of the resultant voltage produced by said parallel inductance-capacitance combinations, biasing means connected to the control grid of said tube rendering said tube non-conductive during the absence of input pulses, and a diode limiter connected to the control grid of said tube in parallel with said biasing means for limiting the negative potential to which the grid can drop when the oscillator blocks.

3. A stabilized blocking oscillator frequency divider circuit including an electron tube having a cathode and a control grid, a plurality of parallel resonant circuits connected in the cathode circuit of said tube, said resonant circuits having inductance and capacitance values such that the resultant of the alternating voltages produced therein when said oscillator blocks is an unsymmetrical alternating voltage, biasing means connected in the grid circuit of said tube for rendering said tube non-conducting during the absence of input pulses, and a diode limiter connected in parallel with said biasing means for limiting the negative potential to which the grid can drop when the oscillator blocks.

4. A stabilized blocking oscillator frequency divider circuit including an electron tube having at least a grid and a cathode, a plurality of parallel resonant circuits serially connected between said cathode and ground, means including a diode connected to said cathode for limiting the magnitude of the resultant oscillations produced by said parallel resonant circuits when said oscillator blocks, a source of negative potential, and a diode connected between the grid of said tube and said source of potential for limiting the potential to which the grid can drop when the oscillator blocks.

5. A circuit for dividing the frequency of a repeated succession of input pulses comprising, a blocking oscillator circuit including an electron tube having at least a control grid and a cathode, a plurality of parallel resonant combinations of inductance and capacitance serially connected in the cathode circuit of said tube, means for applying said pulses to the cathode of said tube, a source of positive potential, a diode connected between the cathode of said tube and said source of positive potential for limiting the magnitude of the resultant voltage produced by said resonant combination, and biasing means connected to the control grid of said tube for rendering said tube non-conducting during the absence of input pulses.

6. A circuit for dividing the frequency of a repeated succession of input pulses comprising, a blocking oscillator circuit including an electron tube having at least a control grid and a cathode, a plurality of parallel resonant combinations of inductance and capacitance serially connected in the cathode circuit of said tube, a source of positive potential, a diode connected between the cathode of said tube and said source of positive potential for limiting the magnitude of the resultant voltage produced by said resonant combinations when said oscillator blocks, and a diode limiter connected to the grid of said tube for limiting the potential to which the grid can drop when the oscillator blocks.

7. A blocking oscillator frequency divider circuit including an electron tube having at least a control grid and a cathode, a pair of parallel resonant circuits serially connected in the cathode circuit of said tube, a first diode limiter connected in parallel with said resonant circuits for limiting the magnitude of the resultant voltage produced by said resonant circuits when said oscillator blocks, and a second diode limiter connected to the grid of said tube for limiting the potential to which the grid can drop when the oscillator blocks.

ROGER B. WOODBURY.

REFERENCES CITED

The following references are of record in the file of this patent:

UNITED STATES PATENTS

| Number | Name | Date |
|---|---|---|
| 1,994,760 | Eitel | Mar. 19, 1935 |
| 2,205,233 | Van Slooten | June 18, 1940 |
| 2,277,000 | Bingley | Mar. 17, 1942 |
| 2,358,297 | Bedford | Sept. 19, 1944 |
| 2,382,954 | Beaudoin | Apr. 21, 1945 |
| 2,399,135 | Miller et al. | Apr. 23, 1946 |